United States Patent [19]
Medley

[11] 3,872,842
[45] Mar. 25, 1975

[54] SPEED CONTROL SYSTEM FOR FAN IN ENGINE COOLING SYSTEM

[75] Inventor: Jackson C. Medley, Oshkosh, Wis.
[73] Assignee: Kress Corporation, Brimfield, Ill.
[22] Filed: June 14, 1973
[21] Appl. No.: 370,018

[52] U.S. Cl. ..... 123/41.12, 74/230.17 F, 123/41.11, 123/41.58
[51] Int. Cl. .............................................. F01p 7/02
[58] Field of Search ........... 123/41.11, 41.12, 41.56, 123/41.58, 41.63, 41.66, 41.65; 74/230.17 F, 230.17 M, 230.17 T

[56] References Cited
UNITED STATES PATENTS

| | | | |
|---|---|---|---|
| 2,045,870 | 6/1936 | Paton | 74/230.17 F |
| 2,173,661 | 9/1939 | Perrine | 123/41.11 |
| 2,658,400 | 11/1953 | Dodge | 123/41.12 |
| 2,678,566 | 5/1954 | Oehrli | 74/230.17 M |
| 2,887,893 | 5/1959 | Class | 123/41.12 |
| 2,916,024 | 12/1959 | Dodge | 123/41.11 |
| 2,916,927 | 12/1959 | Opper | 74/230.17 F |
| 2,917,937 | 12/1959 | Dodge | 123/41.12 |
| 3,043,152 | 7/1962 | Karig | 74/230.17 F |
| 3,081,642 | 3/1963 | Emerson | 74/230.17 F |
| 3,115,049 | 12/1963 | Moan | 74/230.17 F |

*Primary Examiner*—Manuel A. Antonakas
*Assistant Examiner*—Daniel J. O'Connor
*Attorney, Agent, or Firm*—Wolfe, Hubbard, Leydig, Voit & Osann, Ltd.

[57] ABSTRACT

A system for controlling the speed of an engine-driven fan that is part of the cooling system for the driving engine. The fan-drive system includes a pair of sheaves interconnected by a drive belt, with one sheave being driven by the engine and the other sheave driving the fan. Both sheaves are pneumatically adjustable to vary the depth of the belt groove, thereby adjusting the effective diameter of the sheave. A pneumatic control system connected to the sheaves maintains both sheaves at minimum effective diameters when the engine temperature is below a first predetermined level, so that the drive belt is slack to prevent driving of the fan, so that the fan does not use any power when its cooling effect is not needed. When the engine temperature reaches the first predetermined level, the pneumatic control system increases the effective diameter of one of the sheaves to drive the fan at a first fan speed/engine speed ratio. When the engine temperature reaches a second, higher predetermined level, the pneumatic control system increases the effective diameter of the other sheave to drive the fan at a higher fan speed/engine speed ratio. The pneumatic control system also includes a governor-operated valve which monitors the engine speed and responds to a predetermined engine speed, when the fan is operating at the higher fan speed/engine speed ratio, to change the effective diameters of the sheaves to reduce the fan speed/engine speed ratio. This reduction in the speed ratio at high engine speeds is desirable because the efficiency of the torque converter is increased at the higher engine speed, so less cooling capacity is required.

15 Claims, 6 Drawing Figures

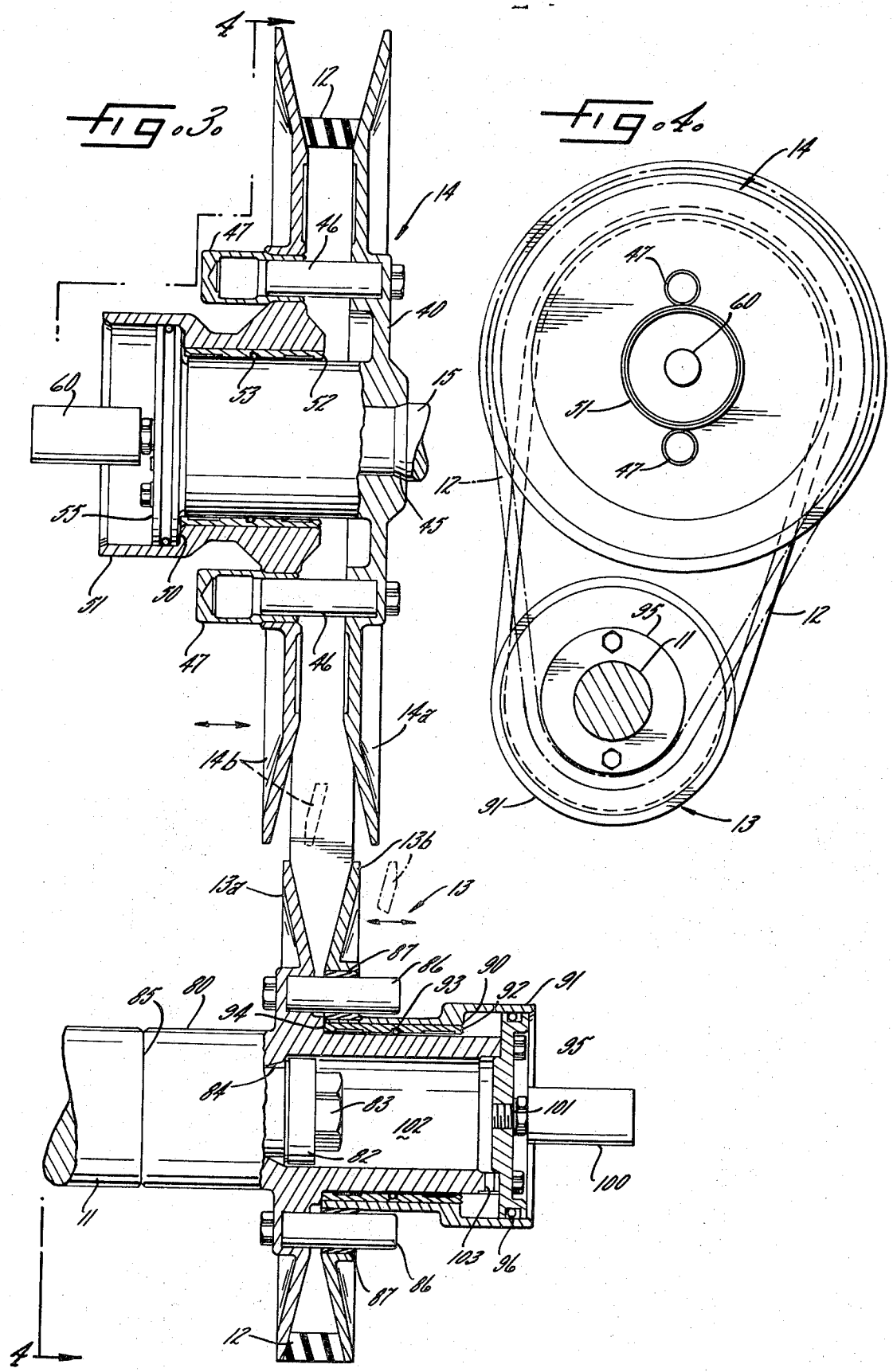

SPEED CONTROL SYSTEM FOR FAN IN ENGINE COOLING SYSTEM

DESCRIPTION OF THE INVENTION

The present invention relates generally to engine-driven fans that form part of the cooling systems for their driving engines and, more particularly, to an improved speed control system for such fans.

It is a primary object of the present invention to provide an improved speed control system for an engine-driven fan which automatically tailors the speed of the fan to the cooling requirements of the engine so that the fan does not consume excessive power generated by the engine, and which is particularly suitable for heavy duty applications such as in vehicles for carrying loads of several tons. In this connection, a related object of the invention is to achieve improved power utilization in an engine system that includes an engine-driven fan in its cooling system.

It is another object of the invention to provide such an improved speed control system that adjusts the fan speed without reducing the efficiency of the fan drive system.

A further object of the invention is to provide an improved speed control system of the foregoing type which significantly reduces fan noise.

Yet another object is to permit the use of a lower weight fan for any given engine size, thereby reducing not only the weight of the fan but also the cost of the fan and acceleration loads on the fan drive system.

A still further object of the invention is to provide such an improved speed control system which can be efficienty manufactured at a relatively low cost, and which provides reliable operation over a wide range of different weather conditions. A related object is to provide such a system which can be built with a rugged construction.

Other objects and advantages of the invention will be apparent from the following detailed description and the accompanying drawings, in which:

FIG. 3 is a longitudinal section of a preferred mechanical embodiment of a portion of the system illustrated in FIG. 1 with portions of the sheave hubs shown in full elevation;

FIG. 4 is an end elevation taken along line 4—4 in FIG. 1, on a reduced scale, and showing the drive belt in two different operative positions;

Figure 1:
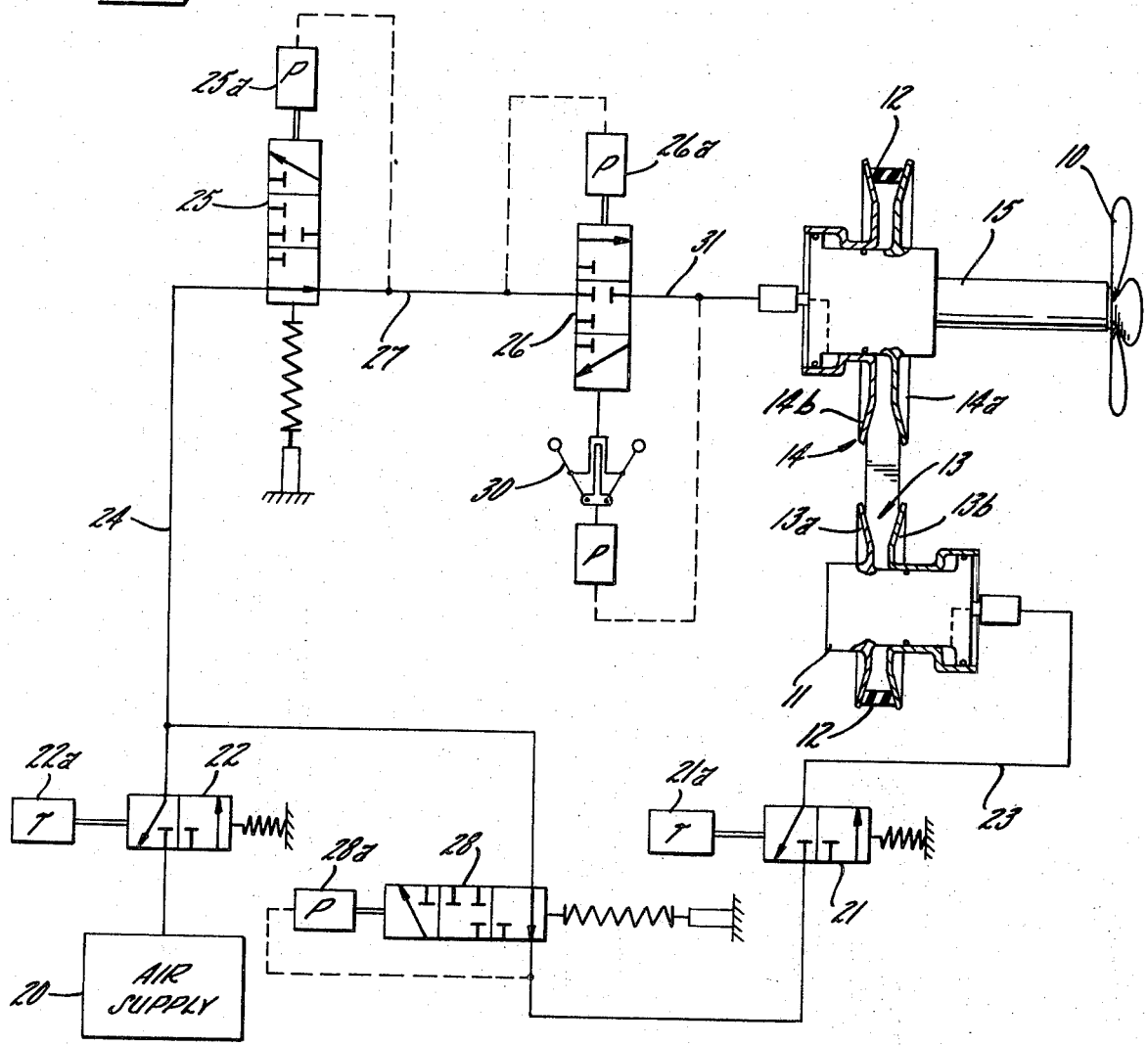
FIG. 1 is a schematic diagram of a speed control system for an engine-driven fan embodying the invention.

While the invention is susceptible of various modifications and alternative forms, specific embodiments thereof have been shown by way of example in the drawings and will hereafter be described in detail. It should be understood, however, that it is not intended to limit the invention to the particular form disclosed but, on the contrary, the intention is to cover all modifications, equivalents and alternatives falling within the spirit and scope of the invention as expressed in the appended claims.

Turning now to the drawings and referring first to FIG. 1, there is shown a fan 10 that is part of the cooling system for an engine that drives a shaft 11. Of course, the engine is normally connected to a torque converter which is also cooled by the same cooling system that cools the engine. To drive the fan 10, a drive belt 12 is trained about an engine sheave 13 fixed to the shaft 11 and a fan sheave 14 fixed to a shaft 15 which carries the fan 10. Thus the fan 10 is driven by the engine at a speed controlled in part by the speed of the engine. In addition, the fan speed can be controlled by varying the effective diameters of one or both of the sheaves 13 and 15, both of which are constructed to permit adjustment of their effective diameters by adjusting the depths of the belt grooves formed by the sheaves.

More particularly, the engine sheave 13 comprises a fixed sheave member 13a and a movable sheave member 13b mounted for axial movement relative to the fixed member 13a. When the movable member 13b is advanced axially toward the fixed member 13a, the depth of the belt groove formed between the two members is reduced, thereby increasing the effective diameter of the sheave 13. Conversely, when the movable member 13b is retracted from the fixed member 13a, the depth of the belt groove formed between the two members is increased, thereby reducing the effective diameter of the sheave. The fan sheave 14 operates in exactly the same menner, having a fixed member 14a and a movable member 14b forming a variable depth groove for the drive belt 12.

In accordance with one important aspect of the present invention, the effective diameters of the sheaves 13 and 14 are reduced sufficiently to disengage the two sheaves at engine temperatures below a predetermined level where the cooling function of the fan 10 is not needed. Thus, the movable members of the two sheaves 13 and 14 are operated by a pressurized fluid such as air from a source 20, but when the engine temperature is below the predetermined level a pair of thermostatically operated valves 21 and 22 disconnect the source 20 from the two sheaves. Consequently, the movable sheave members 13b and 14b move away from the corresponding fixed members 13a and 14a due to the wedging action of the belt on the movable sheave members so that the drive belt 12 goes slack, thereby disengaging the two sheaves 13 and 14 from each other so that the fan stands at rest, consuming no power. The valves 21 and 22 are conventional two-way valves that are normally biased to the positions illustrated in FIG. 1 where any pressure in the lines 23 and 24 leading to the two sheaves is exhausted to atmosphere or sump. operation of the valves 21 and 22 is controlled by respective thermostats 21a and 22a which sense the engine temperature at a convenient point in the engine cooling system, such as in the radiator outlet, and throw the valves 21 and 22 to their second positions when the engine temperature reaches predetermined levels determined by the settings of their thermostats. When either valve 22 or valves 21 and 22 are thrown to the second position, the source 20 is connected to the corresponding line 23 or 24. An example of the type of valve that can be used as the valves 21 and 22 is the Shutterstat Valve made by Kysor of Cadillac.

In accordance with another aspect of the invention, the effective diameters of the sheaves are increased at two different predetermined engine temperatures to drive the fan 10 at two different fan speed/engine speed ratios. Thus, when the first predetermined engine temperature is reached, the thermostatically operated valve is actuated to connect the fan sheave 14 to the pressurized air source 20 via a pressure-regulating valve 25 and a governor-controlled valve 26. The pressurized air advances the movable sheave member 14b toward the fixed sheave member 14a, thereby increasing the effective diameter of the sheave 14 to take up sufficient slack in the drive belt 12 to interconnect the two sheaves 13 and 14 and drive the fan 10 at a speed proportional to the engine speed.

The pressure-regulating valve 25 is a conventional three-way valve that maintains a preselected constant pressure in the line 27 leading to the valve 26 by means of a pressure responsive actuator 25a that continuously monitors the pressure in the line 27. The valve 25 is normally biased to the position illustrated in FIG. 1 to provide a direct connection between lines 24 and 27. When the pressure in line 27 builds up to the preselected level, however, the actuator 25a throws the valve 25 to the center position which disconnects the lines 24 and 27, thereby maintaining the pressure in line 27 constant at the preselected level. If the pressure in the line 27 rises above the preselected level, the actuator 25a throws the switch to the third position which exhausts fluid from line 27 until the pressure drops to the preselected level, whereupon the actuator 25a returns the valve to the center position to maintain the preselected pressure level in line 27. An example of the type of valve that can be used as the valve 25 is the "Pressure Regulator" valve made by Bendix Westinghouse Automotive Airbrake Co.

When the engine temperature reaches the second predetermined level, determined by the setting of the thermostat 21a, the valve 21 is thrown to its second position to connect the source 20 to the engine sheave 13 via a pressure-regulating valve 28. The pressurized air advances the movable sheave member 13b toward the fixed sheave member 13a, thereby increasing the effective diameter of the sheave 13 to change the ratio of fan speed to engine speed. More specifically, when the effective diameter of the engine sheave 13 is increased, the resulting increased belt tension moves the fan sheave member 14b away from the fixed member 14a to an intermediate position, with a corresponding reduction in the effective diameter of the fan sheave 14. The net effect of the increased engine sheave diameter and reduced fan sheave diameter is to increase the fan speed/engine speed ratio, thereby increasing the fan speed for any given engine speed. The pressure-regulating valve 28 operates in exactly the same manner as the valve 25 described previously.

As still another feature of the invention, the ratio of fan speed to engine speed is reduced whenever (1) the fan is operating at the higher of the two fan speed/engine speed ratios determined by operation of the valves 21 and 22 and (2) the engine speed is increased to a predetermined level. This reduction in the fan speed/engine speed ratio matches the fan speed with the reduction in cooling requirements at engine speeds above the predetermined level due to increased torque converter efficiency. Thus, the higher of the two fan speed/engine speed ratios is typically selected to provide adequate cooling at a torque converter efficiency as low as 70 percent and an ambient temperature as high as 110°F. When the engine speed increases to a certain level, however, the torque converter efficiency increases with reduction of converter "slip," and so the cooling requirements actually decrease with further increases in engine speed. Accordingly, the illustrative speed control system includes a governor 30 for controlling the valve 26 connected between the pressure regulating valve 25 and the fan sheave 14 to reduce the fan speed/engine speed ratio in accordance with the reduced cooling requirements above a selected engine speed.

The valve 26 is initially thrown to the position illustrated in FIG. 1 by a pressure responsive actuator 26a which monitors the pressure in line 27. That is, whenever the pressure in line 27 reaches the predetermined level determined to valve 25, the actuator 26a positions the valve 26 as illustrated in FIG. 1 to provide a direct connection from line 27 to the sheave 14. From this point on, the valve 26 is controlled by the governor 30 which is turned at a speed proportional to the engine speed and senses the air pressure in the line leading to the sheave 14. The governor 30 has no effect on the effective diameter of the sheave 14 until the engine reaches a predetermined speed at which the governor increases the air pressure applied to the fan sheave 14 sufficiently to overcome the force of the drive belt 12, thereby increasing the effective diameter of the fan sheave. This increases the tension on the drive belt 12, which in turn forces the movable member 13b of the engine sheave away from the fixed member 13a to reduce the effective diameter of the sheave 13. The net result of the increased diameter of the fan sheave 14 and the reduced diameter of the engine sheave 13 is to reduce the fan speed/engine speed ratio, producing a slower fan speed for any given engine speed. This speed ratio is continuously reduced with increasing engine speed.

Returning to the operation of the governor 30, its function is to control the ratio between the pressure actually applied to the sheave 14 via line 31 and the constant supply pressure in line 27. When the governor 30 senses a preselected pressure inside the sheave 14, it throws the valve 26 to its center position which blocks any further pressure increase in the sheave. As the engine speed increases, the governor 30 gradually increases the pressure ratio between lines 31 and 27 by automatically changing the pressure at which it throws the valve 26 to its center position so that a greater proportion of the supply pressure in line 27 is applied to the movable sheave member 14b. The resulting increase in the pressure applied to the sheave 14 increases the effective diameter of that sheave, thus increasing the belt tension to reduce the fan speed engine speed ratio as described above.

Figure 2:
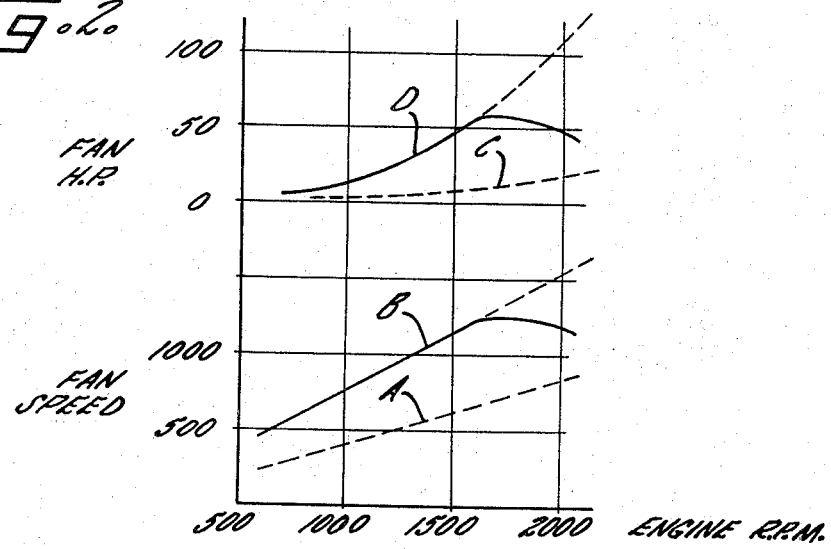
FIG. 2 is a graphic illustration of the fan speed and horse-power characteristics, as a function of engine speed, of an exemplary embodiment of the invention.
Figure 5:
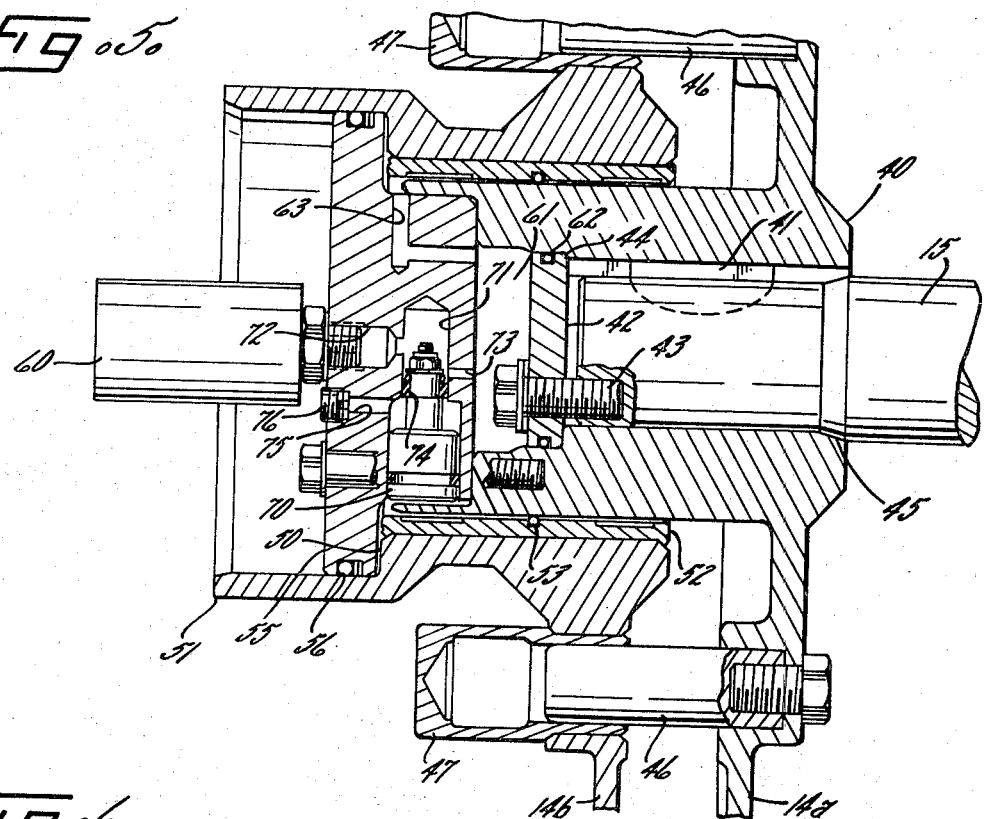
FIG. 5 is an enlarged view of the central portion of the upper sheave assembly in FIG. 3 and showing the entire hub assembly in section.
Figure 6:
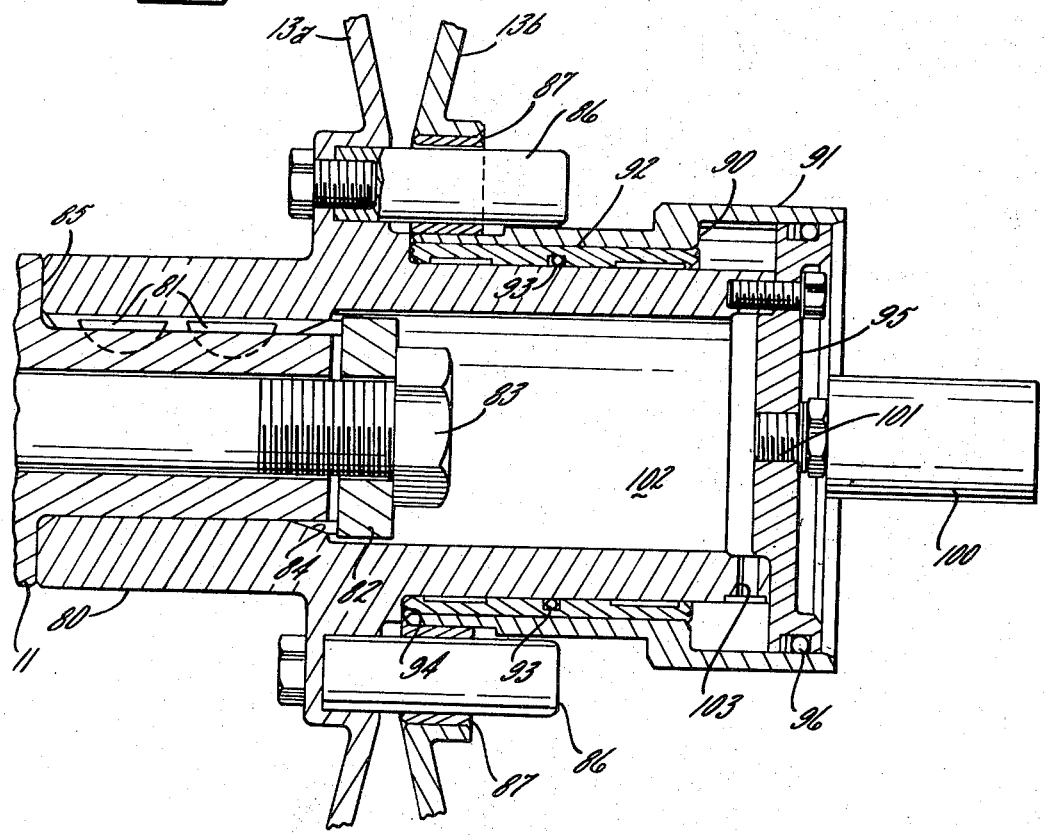
FIG. 6 is an enlarged view of the central portion of the lower sheave assembly in FIG. 3 and showing the entire hub assembly in section.

In FIG. 2, there are shown exemplary fan speed and horsepower characteristics as a function of engine speed for a 1,200 hp. engine. It has been found that in this particular system the improved fan speed control system of the invention makes between 66 and 120 additional horsepower available for work other than driving the fan. The fan speed characteristic after actuation of the valve 22 but before actuation of the valve 21 is illustrated by the broken-line curve A in FIG. 2, providing a fan speed/engine speed ratio of about 0.43. After the valve 21 is actuated, this ratio is increased to 0.76 as shown by the solid-line curve B in FIG. 2. This latter ratio is maintained up to an engine speed of 1,600 rpm, where the governor 30 causes the ratio to taper off as shown in FIG. 2. The upper portion of FIG. 2 illustrates the horsepower savings made possible by this invention, showing that the horsepower requirements of the fan follow curves C and D, corresponding to the speed curves A and B, respectively. And an additional power saving, not illustrated in FIG. 2, is achieved by complete disengagement of the fan at cold radiator temperatures frequently encountered in the winter and in cold climates.

In FIGS. 3 through 6 there is illustrated a preferred mechanical embodiment of the sheaves 13 and 14 and the governor-controlled valve 26 shown schematically in FIG. 1. Elements corresponding to those illustrated in FIG. 1 are identified by the same reference numerals in FIGS. 3-6 to facilitate correlation of the schematic and mechanical drawings. In this preferred embodiment the fan shaft 15 carries a fixed sheave member 14a and a movable sheave member 14b on a hub 40 secured to the shaft 15 by means of a key 41 (FIG. 5) and a retaining plate 42. The retaining plate 42 is fastened to the shaft 15 by means of bolts 43 threaded into the end of the shaft 15, with the periphery of the plate 42 overlapping a shoulder 44 on the hub 40 to hold the hub against a tapered shoulder 45 formed on the shaft 15. The sheave member 14a is formed as an integral part of the hub 40 for rotation therewith, and is connected to the movable sheave member 14b by means of a pair of pins 46. One end of each pin 46 is bolted to the member 14a, and the other end is telescoped into a thimble 47 rigidly fastened to the movable sheave member 14b. Thus, it can be seen that the member 14b is locked to the member 14a in the circumferential direction so that the two members always rotate together, but the pins 46 permit relative movement between the two sheave members 14a and 14b in the axial direction.

To move the sheave member 14b in the axial direction, pressurized air is applied to the surface of a radial shoulder 50 formed by an axially movable sleeve 51 secured to the inner periphery of the member 14b. The radially inner surface of the sleeve 51 carries a bearing 52 riding on the outer surface of the hub 40, with an O-ring 53 disposed in a circumferential groove in the inner surface of the bearing 52 providing a fluid seal around the interface of the bearing 52 and hub 40 to prevent the leakage of pressurized air therethrough. Axial movement of the sleeve 51, and thus the sheave member 14b, toward the fixed sheave member 14a is limited by abutment of the sleeve 51 and sheave member 14b against the sheave member 14a, while retracting movement is limited by abutment of the sleeve shoulder 50 against an end cap 55 bolted to the end of the hub 40. Leakage of pressurized air along the outer periphery of the end cap 55 is prevented by means of an O-ring 56 held in a slot in the periphery of the cap 55 and bearing against the inner surface of the sleeve 51.

Pressurized air is supplied to the shoulder 50 of the sleeve 51 from a rotary air inlet fitting 60 fastened to the center of the end cap 55 and receiving pressurized air from the line 31 (FIG. 1). From the fitting 60, the air passes through a governor-controlled valve built into the body of the cap 55, and on into a sealed chamber 61 formed between the end cap 55 and the retaining plate 42. This chamber 61 is sealed by an O-ring 62 held in a slot in the outer periphery of the plate 42 and bearing against the opposed surface of the hub 40. From the chamber 61, the air passes axially and then radially through a passageway 63 in the end cap 55, and then radially outwardly past the end of the hub 40 to the annular space between the fixed end cap 55 on one side and the axially movable sleeve 51 and bearing 52 on the other side. When the air enters this annular space, of course, it urges the sleeve 51 and the movable sheave member 14b away from the fixed end cap 55 and toward the fixed sheave member 14a, i.e., axially to the right as viewed in FIGS. 3 and 5.

Advancing axial movement of the sheave member 14b toward member 14a is resisted by the force of the drive belt 12 riding in the tapered groove formed by the outer peripheries of the two sheave members. The greater the tension on the belt, the greater the resistance to advancing movement of the sheave member 14b. And of course if the tension on the belt 12 is great enough, it can overcome the force of the pressurized air and move the member 14b to the left away from the member 14a. It can be seen that movement of the member 14b to the right or left always changes the effective depth of the sheave groove, thereby changing its effective diameter and thus the tension on the drive belt 12. Consequently, the belt tension is increased or decreased as the sheave member 14b is advanced or retracted, and a point may be reached between the two limit positions of the member 14b where the opposing forces of the pressurized air and the belt tension are in equilibrium, so that the member 14b is stopped at that intermediate position rather than proceeding all the way to one of its limit positions. This is, in fact, what happens when both the valves 21 and 22 are actuated; the actuation of valve 22 first advances the member 14b into engagement with the member 14a to produce the maximum effective diameter of the sheave 14, and then the subsequent actuation of valve 21 increases the belt tension sufficiently to retract the member 14b to an intermediate position, producing a corresponding intermediate effective diameter of the sheath 14.

Returning now to the governor-controlled valve 26 built into the end cap 55, the governor 30 is formed by a piston 70 (FIG. 5) slidably mounted in a radial bore 71 in the end cap 55. The radial bore 71 also forms a part of the air passageway that interconnects the rotary air inlet fitting 60 and a chamber 61. More particularly, when the piston 70 is in the position illustrated in FIG. 5, air flows from the fitting 60 through an axial port 72 into the radial bore 71, and then on through a second axial port 73 into the chamber 61. Thus, the pressure in the chamber 61, and consequently in the annular space between the end cap 55 and the shoulder 50, increases toward the constant pressure level maintained in the line 27 (FIG. 1). It can be seen in FIG. 5 that the pressure in the chamber 61 is also applied to the large outer face of the piston 70; consequently, when the pressure in the chamber 61 reaches a certain level, it forces the piston 70 radially inwardly so that a sealing ring 74 on the smaller-diameter inner end of the piston 70 blocks the port 73 to prevent any further increase in the pressure within the chamber 61. The exact pressure level at which the piston 70 is forced inwardly is dependent on the engine speed at any given time because the piston 70 is constantly rotating with the fan shaft 15 and, therefore, is constantly urged outwardly by centrifugal force. This centrifugal force varies with the speed of the fan shaft, which in turn is proportional to the engine speed, so the air pressure required to overcome the centrifugal force acting on the piston 70 increases with increasing engine speed and, conversely, decreases with decreasing engine speed.

When the fan is operating on the low speed curve A, i.e., when air pressure is applied only to the fan sheave 14, the governor piston 70 has no effect on the effective diameter of the fan sheave 14, but it provides sufficient pressure to transmit the required driving torque to the fan. However, after the valve 21 is actuated to increase the effective diameter of the engine sheave 13, thereby increasing the drive belt tension and reducing the effective diameter of the fan sheave 14, the governor comes into play as a speed controller because a predetermined increase in the air pressure acting on the fan sheave 14 changes the fan speed/engine speed ratio. More specifically, when the air pressure acting on the fan sheave 14 reaches a predetermined level, the drive belt tension is overcome to increase the effective diameter of the fan sheave, with a resulting decrease in the effective diameter of the engine sheave 13, thereby reducing the fan speed/engine speed ratio. Since the pressure applied to the fan sheave 14 is controlled by the governor piston 70, which in turn is controlled by engine speed, the transition described above occurs at a predetermined engine speed. In the particular example illustrated in FIG. 2, this predetermined engine speed is 1,600 rpm, as can be seen from the change that occurs in the slope of curve B at this speed.

When the engine speed decreases, the centrifugal force acting on the piston 70 is reduced, allowing the air pressure acting on the large outer end of the piston 70 to move the piston 70 inwardly until the sealing ring 74 moves inwardly past the port 73. This opens the port 73 to atmosphere through the central portion of the piston bore 72 and an axial port 75 formed in the end cap 55, thereby reducing the pressure in the chamber 61 until the opposing forces acting on the piston 70 again reach an equilibrium condition which moves the piston 70 back to its neutral position where it blocks the port 73. To prevent excessive oscillation or "hunting" of the governor piston 70, an orifice 76 is provided in the discharge port 75 to control the rate at which air pressure is bled off to atmosphere.

Turning next to the engine sheave 13, the engine-driven shaft 11 carries a fixed sheave member 13a and a movable sheave member 13b on a hub 80 secured to the shaft 11 by means of keys 81 and the retaining plate 82. The retaining plate 82 is fastened to the shaft 11 by means of a bolt 83 threaded into the end of the shaft 11, with the periphery of the plate 82 overlapping a shoulder 84 on the hub 80 to hold the hub against a shoulder 85 formed on the shaft 11. The sheave member 14a is formed as an integral part of the hub 80 for rotation therewith, and is connected to the movable sheave member 13b by means of a pair of pins 86. One end of each pin 86 is bolted to the fixed sheave member 13a, and the other end is telescoped through a bearing sleeve 87 rigidly fastened to the movable sheave member 13b. Thus, it can be seen that the member 13b is locked to the member 13a in the circumferential direction so that the two members always rotate together, but the pins 86 permit relative movement between the two sheave members 13a and 13b in the axial direction.

To move the sheave member 13b in the axial direction, pressurized air is applied to the surface of a radial shoulder 90 formed by an axially movable sleeve 91 secured to the inner periphery of the member 13b. The radially inner surface of the sleeve 91 carries a bearing 92 riding on the outer surface of the hub 80, with an O-ring 93 disposed in a circumferential groove in the inner surface of the bearing 92 providing a fluid seal around the interface of the bearing 92 and hub 80 to prevent the leakage of pressurized air therethrough. Axial movement of the sleeve 91, and thus the sheave member 13b, toward the fixed sheave member 13a is limited by abutment of the sleeve 91 and bearing 92 against a shoulder 94 on the hub 80, while retracting movement is limited by abutment of the sleeve shoulder 90 against an end cap 95 bolted to the end of the hub 80. Leakage of pressurized air along the outer periphery of the end cap 95 is prevented by means of an O-ring 96 held in a slot in the periphery of the cap 95 and bearing against the inner surface of the sleeve 91.

Pressurized air is supplied to the shoulder 90 of the sleeve 91 from a rotary air inlet fitting 100 fastened to the center of the end cap 95 and receiving pressurized air from the line 23 (FIG. 1). From the fitting 100, the air passes through a central port 101 extending through the end cap 95 and opening into a sealed chamber 102 formed between the end cap 95, the hub 80, and the end of the shaft 11. From the chamber 102, the air passes radially outwardly through a passage 103 in the hub 80 into an annular space between the fixed end cap 95 on one side and the axially movable sleeve 91 and bearing 92 on the other side. When the air enters this annular space, of course, it urges the sleeve 91 and the movable sheave member 13b away from the fixed end cap 95 and toward the fixed sheave member 13a, i.e., axially to the left as viewed in FIGS. 3 and 6. The advanced position of the movable sheave member 13b is shown in solid line in FIGS. 3 and 6, and retracted position is indicated by the fragmentary broken line illustration in FIG. 3. In FIG. 4, the drive belt 12 is illustrated in its two extreme positions on the sheave 13, i.e., the radially innermost position of the belt 12 when the effective diameter of the sheave 13 is at its minimum, and the radially outermost position of the belt 12 when the effective diameter of the sheave 13 is at its maximum.

Advancing axial movement of the sheave member 13b toward member 13a is resisted by the force of the drive belt 12 riding in the tapered groove formed by the outer peripheries of the two sheave members. The greater the tension on the belt, the greater the resistance to advancing movement of the sheave member 13b. And of course if the tension on the belt 12 is great enough, it can overcome the force of the pressurized air and move the member 13b to the right away from the fixed member 13a. It can be seen that the movement of the member 13b to the right or left always changes the effective depth of the sheave groove, thereby changing its effective diameter and thus the tension on the drive belt 12.

It can be seen from the foregoing detailed description that this invention provides an improved speed control system for an engine driven fan which automatically tailors the speed of the fan to the cooling requirements of the engine so that the fan does not consume excessive power generated by the engine, thereby providing improved power utilization in the overall engine system. This fan speed control system is particularly suitable for use in heavy duty engine systems, such as those for driving vehicles which have a capacity for carrying loads of several tons. Since the fan is always driven through the same mechanical elements, this fan speed can be adjusted without reducing the efficiency of the fan drive system. This system permits the use of a smaller fan for any given application, thereby providing significant reductions in fan noise and weight, with attendant reductions in the cost of the fan and acceleration loads on the fan drive system. Furthermore, the speed control system can be efficiently manufactured at a low cost, provides reliable operation over a wide range of different weather conditions, can be built with a rugged construction.

I claim as my invention:

1. A speed control system for an engine-driven fan that is part of the cooling system for the driving engine, said speed control system comprising the combination of
   a. a pair of sheaves one of which is connected to said engine and the other of which is secured to a shaft carrying the fan, each of said sheaves including
      1. a fixed sheave member,
      2. a movable sheave member mounted for axial movement relative to the fixed sheave member for varying the effective diameter of the sheave,
      3. and fluid pressure-operated adjusting means connected to the movable sheave member for adjusting the axial position thereof,
   b. a source of fluid pressure for operating said adjusting means,
   c. a drive belt trained around the two sheaves for driving the fan from the engine with the speed of the fan depending on the effective diameters of the sheaves as well as the engine speed,
   d. a pair of thermostatically operated valves connected between the source of fluid pressure and the adjusting means of the two sheaves with the thermostats of the two valves sensing the engine temperature, said valves being
      1. responsive to engine temperatures above said first predetermined level and below a second predetermined level for connecting said pressure source to the adjusting means of the fan sheave to increase the effective diameter of the fan sheave and thereby drive the fan at a speed corresponding to a first predetermined ratio of fan speed to engine speed,
      2. and responsive to engine temperatures above said second predetermined level for connecting said pressure source to the adjusting means of the engine sheave to increase the effective diameter of the engine sheave and thereby drive the fan at a speed corresponding to a second predetermined ratio of fan speed to engine speed to increase the fan speed.

2. A speed control system as set forth in claim 1 which includes means responsive to a preselected engine speed for adjusting the fluid pressure on the adjusting means of at least one of said sheaves to reduce the ratio of fan speed to engine speed.

3. A speed control system as set forth in claim 2 wherein said means responsive to the preselected engine speed adjusts the fluid pressure on the adjusting means of both of said sheaves to increase the effective diameter of the one sheave and reduce the effective diameter of the other sheave to effect the desired reduction in the ratio of fan speed to engine speed.

4. A speed control system as set forth in claim 2 wherein said means responsive to the preselected engine speed continuously reduces the ratio of fan speed to engine speed with continuing increases in engine speed above said preselected speed.

5. A speed control system as set forth in claim 2 wherein said engine is connected to a torque converter, and said preselected engine speed is the speed corresponding to 70 percent converter efficiency.

6. A speed control system as set forth in claim 1 which includes means for terminating the driving of the fan in response to engine temperatures below said first predetermined level of engine temperature.

7. A speed control system for an engine-driven fan that is part of the cooling system for the driving engine, said speed control system comprising the combination of:
   a. a pair of sheaves one of which is connected to said engine and the other of which is secured to a shaft carrying the fan, each of said sheaves including
      1. a fixed sheave member,
      2. a movable sheave member mounted for axial movement relative to the fixed sheave member for varying the effective diameter of the sheave,
      3. and fluid pressure-operated adjusting means connected to the movable sheave member for adjusting the axial position thereof,
   b. a source of fluid pressure for operating said adjusting means,
   c. a drive belt trained around the two sheaves for driving the fan from the engine with the speed of the fan depending on the engine speed and the effective diameters of the sheaves,
   d. a pair of thermostatically operated valves connected between the source of fluid pressure and the adjusting means of the two sheaves with the thermostats of the two valves sensing the engine temperature, said valves being
      1. responsive to engine temperatures below a first predetermined level for disconnecting said pressure source from the adjusting means of both sheaves to reduce the effective diameters of both of the sheaves to effectively disconnect the fan from the engine so that the fan is not operated,
      2. responsive to engine temperatures above said first predetermined level and below a second predetermined level for connecting said pressure source to the adjusting means of the fan sheave to increase the effective diameter of the fan sheave and thereby drive the fan at a speed corresponding to a first predetermined ratio of fan speed to engine speed,
      3. and responsive to engine temperatures above said second predetermined level for connecting said pressure source to the adjusting means of the engine sheave to increase the effective diameter of the engine sheave and thereby drive the fan at a speed corresponding to a second predetermined ratio of fan speed to engine speed to increase the fan speed,
   e. and a governor responsive to the fan speed for varying the adjusting means of the fan sheave at fan speeds above a predetermined level to increase the effective diameter of the fan sheave and thereby reduce the effective diameter of the engine sheave to reduce the ratio of fan speed to engine speed.

8. A method of controlling the speed of an engine-driven fan that is part of the cooling system for the driving engine, said method comprising the steps of:
   a. providing a pair of sheaves one of which is connected to said engine and the other of which is secured to a shaft carrying the fan, each of said sheaves including
      1. a fixed sheave member,
      2. a movable sheave member mounted for axial movement relative to the fixed sheave member for varying the effective diameter of the sheave,
      3. and fluid pressure-operated adjusting means connected to the movable sheave member for adjusting the axial position thereof,
   b. providing a source of fluid pressure for operating said adjusting means,
   c. training a drive belt around the two sheaves to drive the fan from the engine with the speed of the fan depending on the effective diameters of the sheaves as well as the engine speed,
      1. connecting said pressure source to the adjusting means of the fan sheave in response to engine temperatures above said first predetermined level and below a second predetermined level to increase the effective diameter of the fan sheave and thereby drive the fan at a speed corresponding to a first predetermined ratio of fan speed to engine speed,
      2. connecting said pressure source to the adjusting means of the engine sheave in response to engine temperatures above said second predetermined level to increase the effective diameter of the engine sheave and thereby drive the fan at a speed corresponding to a second predetermined ratio of fan speed to engine speed to increase the fan speed.

9. A speed control method as set forth in claim 8 which includes the step of adjusting the fluid pressure on the adjusting means of at least one of said sheaves in response to a preselected engine speed to reduce the ratio of fan speed to engine speed.

10. A speed control method as set forth in claim 9 wherein the ratio of fan speed to engine speed is continuously reduced with continuing increases in engine speed above said preselected speed.

11. A speed control method as set forth in claim 9 wherein said engine is connected to a torque converter, and said preselected engine speed is the speed corresponding to 70 percent converter efficiency.

12. A speed control method as set forth in claim 8 which includes the step of terminating the driving of the fan in response to engine temperatures below said first predetermined level of engine temperature.

13. A speed control system for an engine-driven fan that is part of the cooling system for the driving engine, said speed control system comprising the combination of:
   a. a pair of sheaves one of which is connected to said engine and the other of which is secured to a shaft carrying the fan, each of said sheaves including
      1. a fixed sheave member,
      2. a movable sheave member mounted for axial movement relative to the fixed sheave member for varying the effective diameter of the sheave,
      3. and fluid pressure-operated adjusting means connected to the movable sheave member for adjusting the axial position thereof,
   b. a source of fluid pressure for operating said adjusting means,
   c. a drive belt trained around the two sheaves for driving the fan from the engine with the speed of the fan depending on the engine speed and the effective diameters of the sheaves,
   d. a pair of pressure regulating valves each of which is connected between the source of fluid pressure and the adjusting means of one of said sheaves for maintaining a preselected constant pressure on the movable members of the respective sheaves,
   e. and a pair of thermostatically operated valves each of which is connected between one of said pressure regulating valves and the adjusting means of the corresponding sheave with the thermostats of the two valves sensing the engine temperature, said thermostatically operated valves adjusting the effective diameters of the two sheaves in response to different engine temperatures.

14. A speed control system as set forth in claim 13 wherein said pressure regulating valves are adjustable to permit selection of different preselected constant pressures.

15. A speed control system for an engine-driven fan that is part of the cooling system for the driving engine, said speed control system comprising the combination of:
   a. a pair of sheaves one of which is connected to said engine and the other of which is secured to a shaft carrying the fan, each of said sheaves including
      1. a fixed sheave member,
      2. a movable sheave member mounted for axial movement relative to the fixed sheave member for varying the effective diameter of the sheave,
      3. and fluid pressure-operated adjusting means connected to the movable sheave member for adjusting the axial position thereof,
   b. a source of fluid pressure for operating said adjusting means,
   c. a drive belt trained around the two sheaves for driving the fan from the engine with the speed of the fan depending on the engine speed and the effective diameters of the sheaves,
   d. a pair of thermostatically operated valves connected between the source of fluid pressure and the adjusting means of the two sheaves with the thermostats of the two valves sensing the engine temperature, said valves being
      1. responsive to engine temperatures below a first predetermined level for disconnecting said pressure source from the adjusting means of both sheaves to reduce the effective diameters of both of the sheaves to effectively disconnect the fan from the engine so that the fan is not operated,
      2. and responsive to engine temperatures above said first predetermined level and below a second predetermined level for connecting said pressure source to the adjusting means of the fan sheave to increase the effective diameter of the fan sheave and thereby drive the fan at a speed corresponding to a predetermined ratio of fan speed to engine speed.

* * * * *